Figure 3:
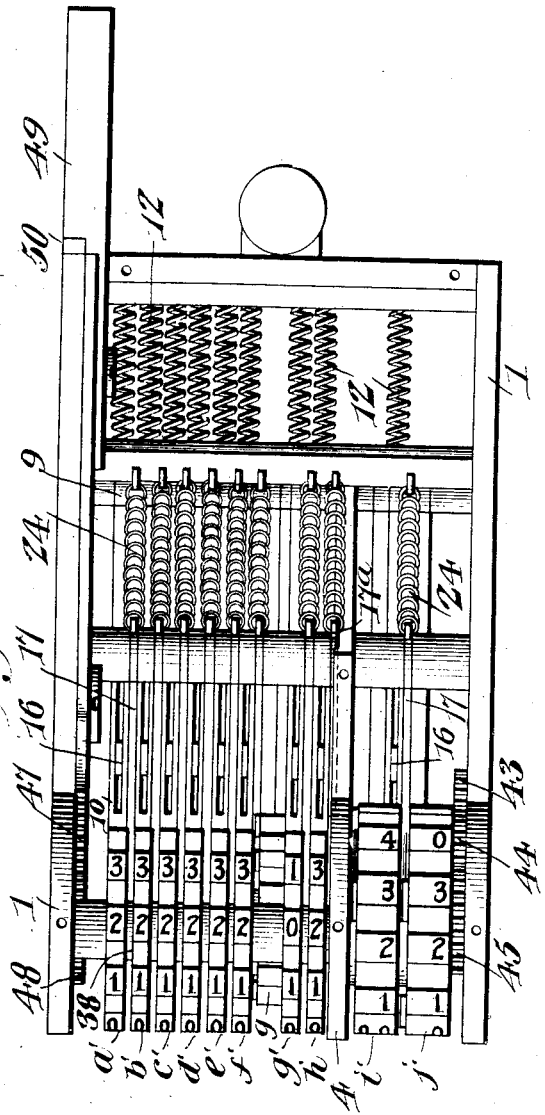

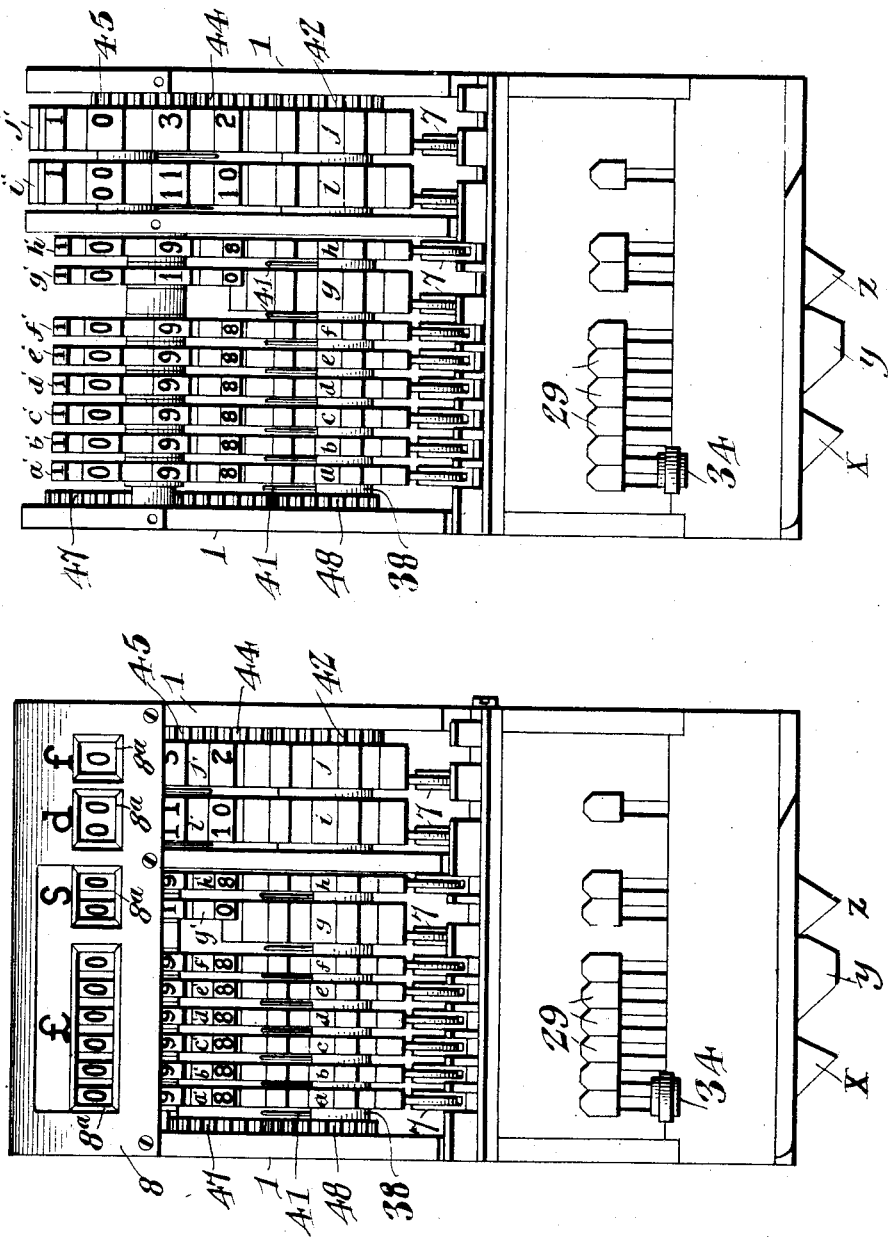
J. A. SMITH.
REGISTER FOR ADDING MACHINES.
APPLICATION FILED NOV. 27, 1907.
1,086,410.
Patented Feb. 10, 1914.
18 SHEETS—SHEET 1.
John A. Smith, Inventor
Witnesses

J. A. SMITH.
REGISTER FOR ADDING MACHINES.
APPLICATION FILED NOV. 27, 1907.

1,086,410.

Patented Feb. 10, 1914.
18 SHEETS—SHEET 2.

Witnesses
Jas. F. McCathran
Doretta A. Colne

John A. Smith, Inventor
By L. G. Julihn
Attorney

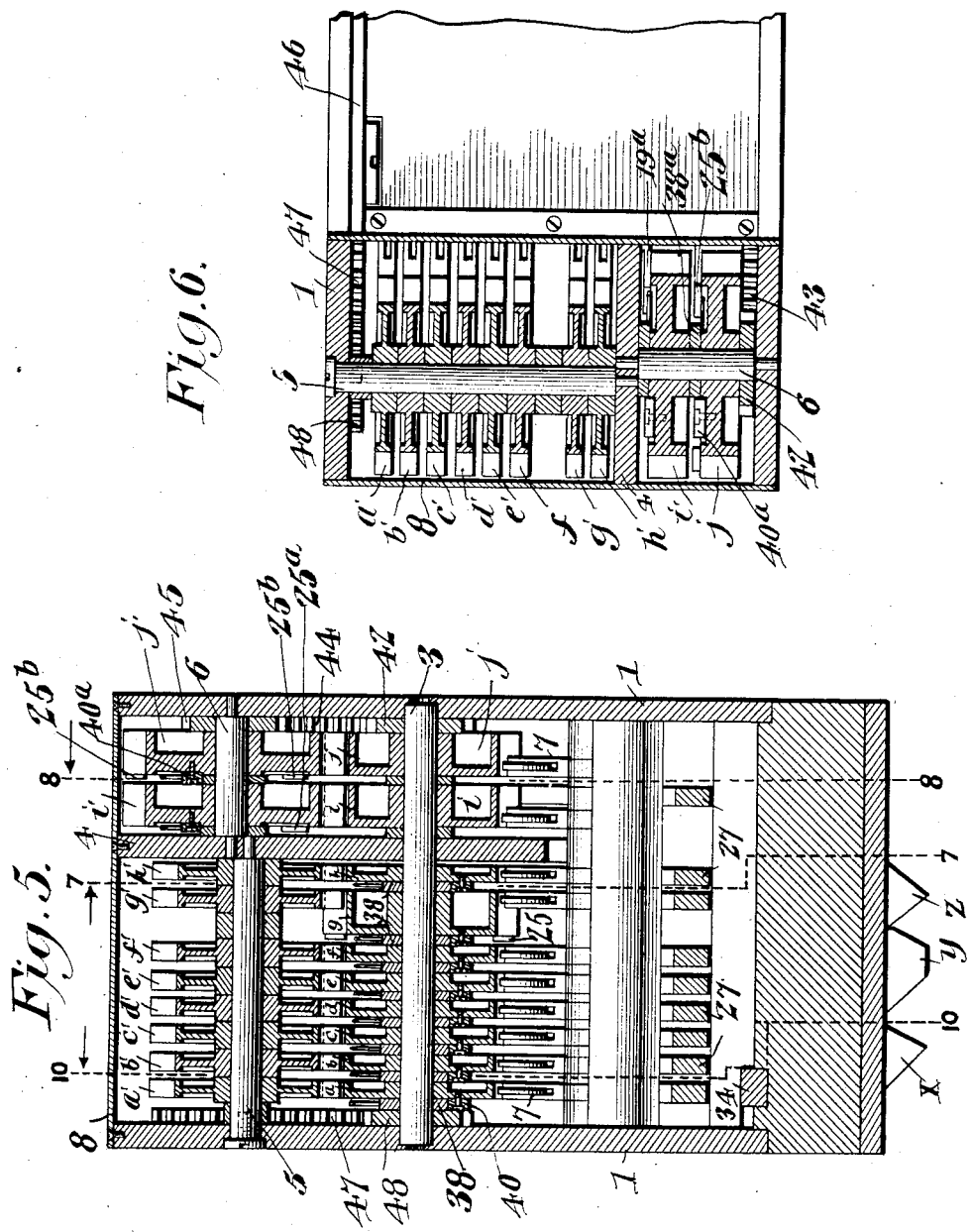

J. A. SMITH.
REGISTER FOR ADDING MACHINES.
APPLICATION FILED NOV. 27, 1907.

1,086,410.

Patented Feb. 10, 1914.
18 SHEETS—SHEET 4.

Witnesses
Jas. K. McCathran
Dretta A. Colne

John A. Smith, Inventor
By L. G. Julihn
Attorney

J. A. SMITH.
REGISTER FOR ADDING MACHINES.
APPLICATION FILED NOV. 27, 1907.

1,086,410.

Patented Feb. 10, 1914.
18 SHEETS—SHEET 6.

Witnesses
Jas. K. McCathran
Doretta A. Colné

John A. Smith Inventor
By L. G. Julihn
Attorney

J. A. SMITH.
REGISTER FOR ADDING MACHINES.
APPLICATION FILED NOV. 27, 1907.

1,086,410.

Patented Feb. 10, 1914.
18 SHEETS—SHEET 8.

Witnesses
Jas. F. McCathran
Doretta A. Colné

John A. Smith, Inventor
By L. G. Julihn
Attorney

J. A. SMITH.
REGISTER FOR ADDING MACHINES.
APPLICATION FILED NOV. 27, 1907.

1,086,410.

Patented Feb. 10, 1914.
18 SHEETS—SHEET 9.

Witnesses
Jas. H. McCathran
Doretta A. Cohne

John A. Smith, Inventor
By L. G. Julihn
Attorney

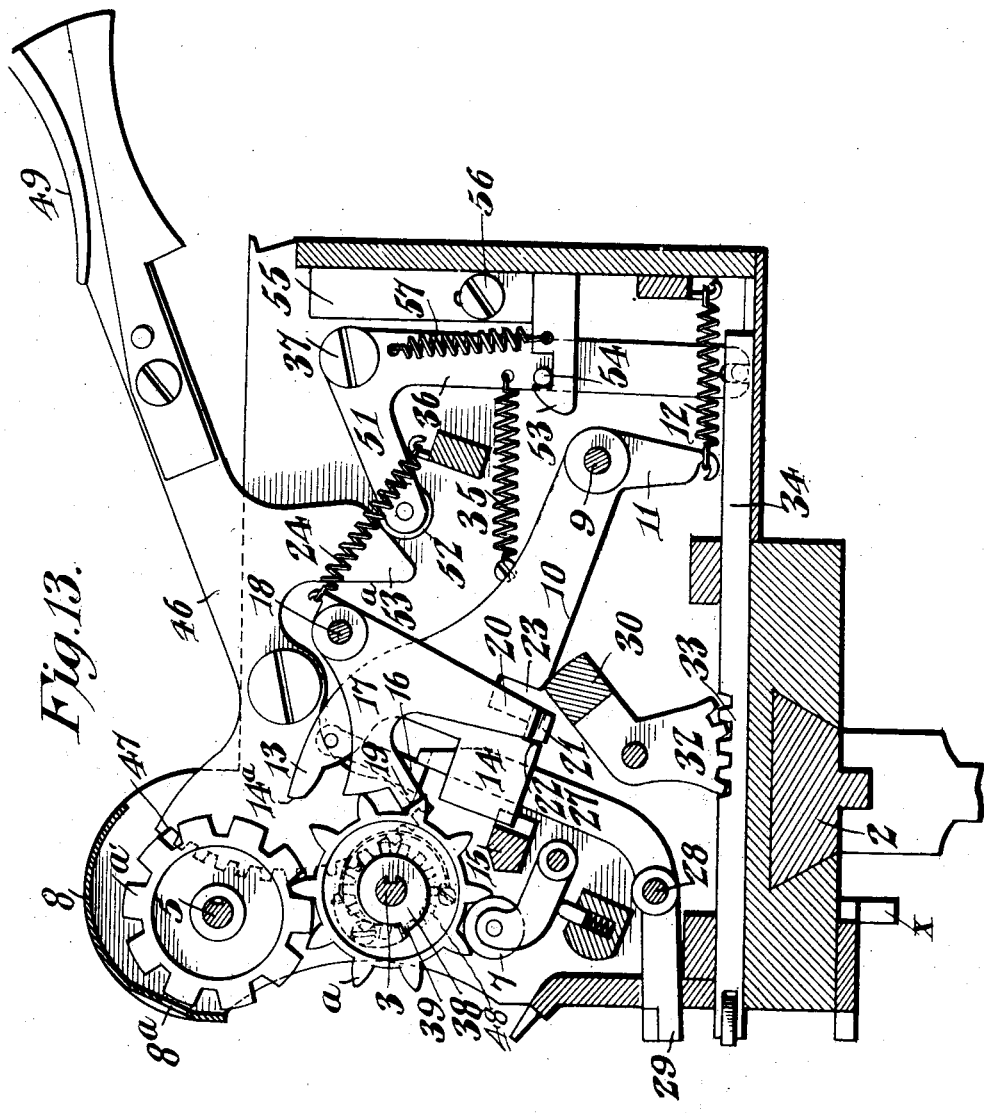

J. A. SMITH.
REGISTER FOR ADDING MACHINES.
APPLICATION FILED NOV. 27, 1907.
1,086,410.
Patented Feb. 10, 1914.
18 SHEETS—SHEET 11.
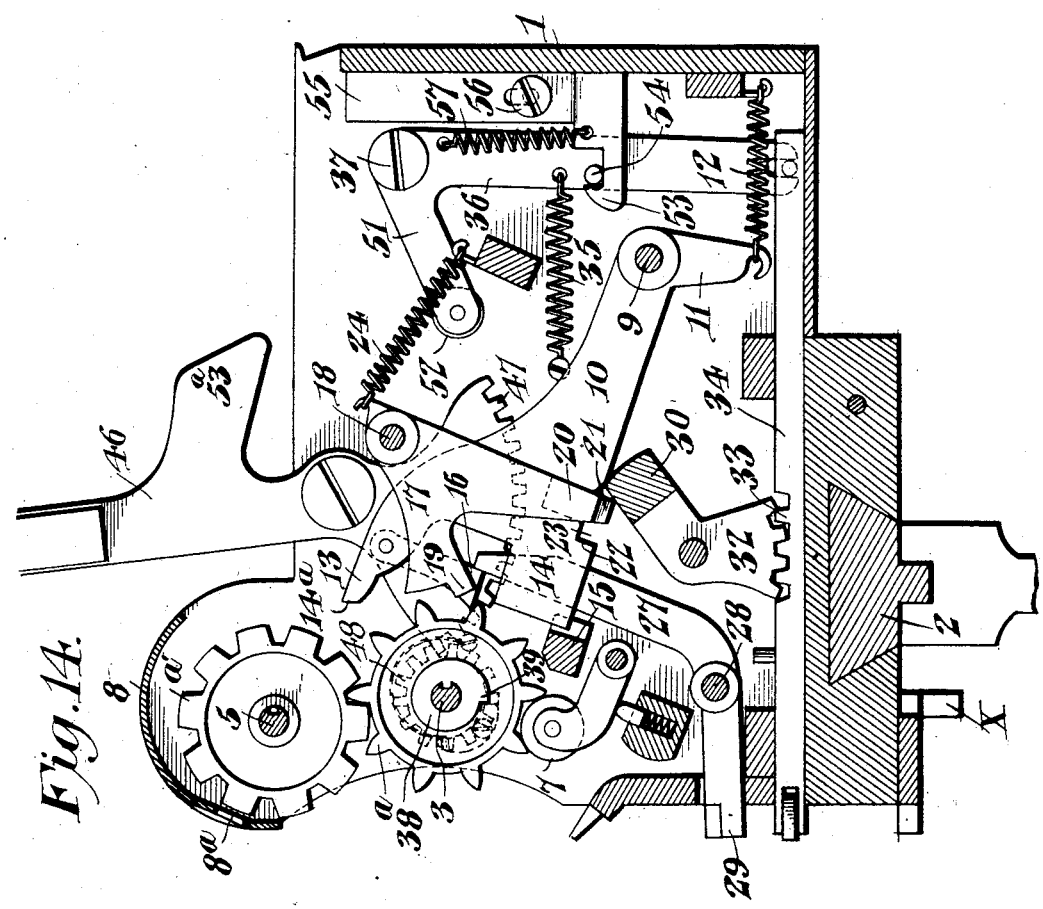
John A. Smith, Inventor J. A. SMITH.
REGISTER FOR ADDING MACHINES.
APPLICATION FILED NOV. 27, 1907.
1,086,410.
Patented Feb. 10, 1914.
18 SHEETS—SHEET 12.
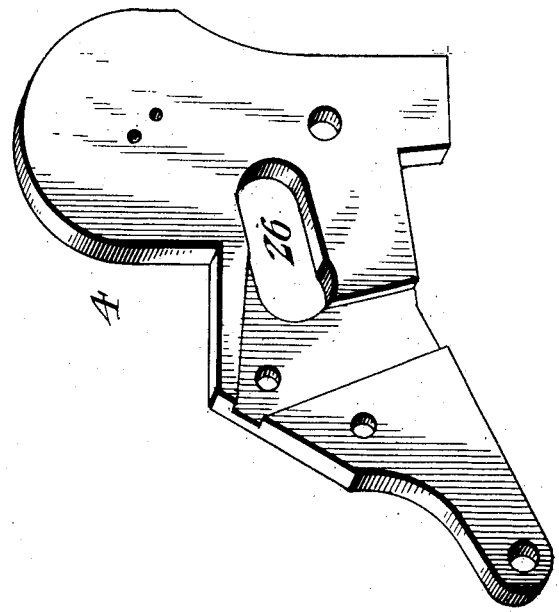
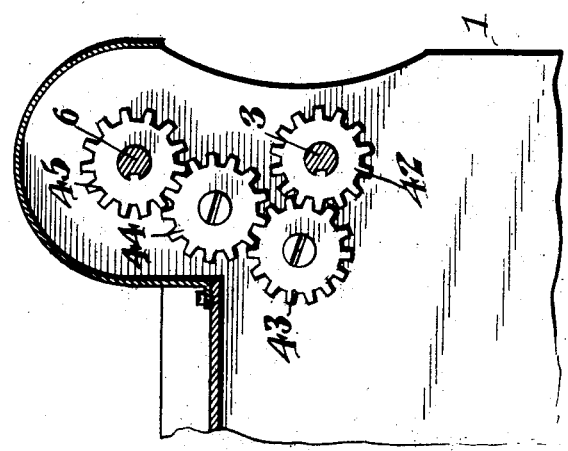
John A. Smith Inventor J. A. SMITH.
REGISTER FOR ADDING MACHINES.
APPLICATION FILED NOV. 27, 1907.
1,086,410.
Patented Feb. 10, 1914.
18 SHEETS—SHEET 13.
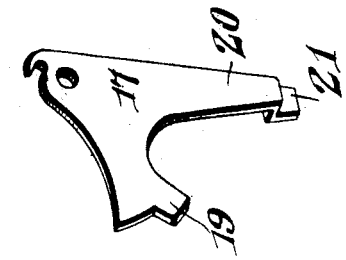
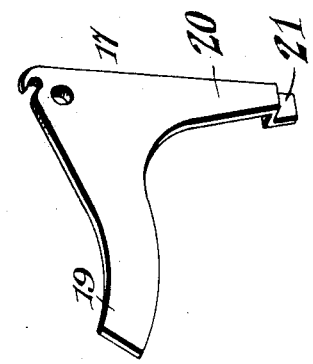
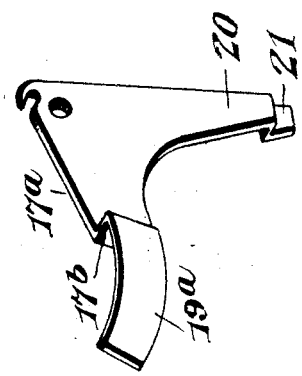
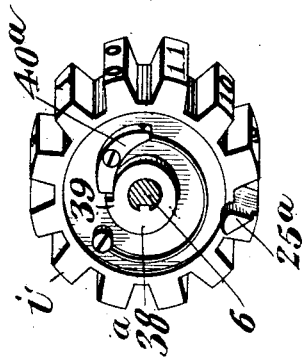
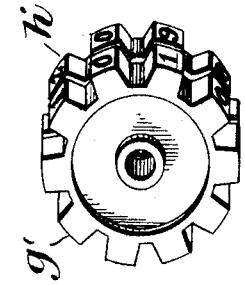
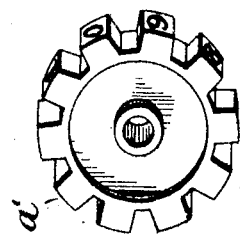
John A. Smith Inventor
Witnesses J. A. SMITH.
REGISTER FOR ADDING MACHINES.
APPLICATION FILED NOV. 27, 1907.
1,086,410.
Patented Feb. 10, 1914.
18 SHEETS—SHEET 14.
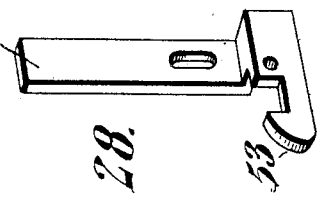
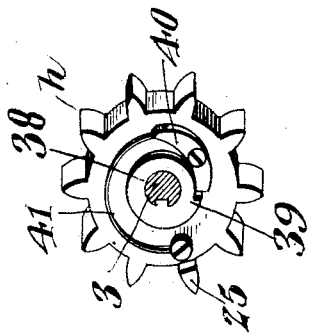
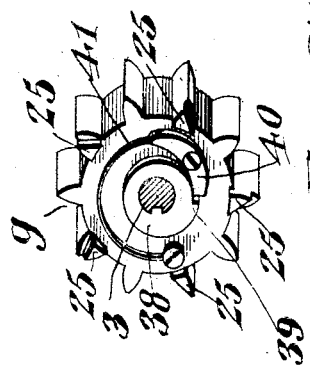
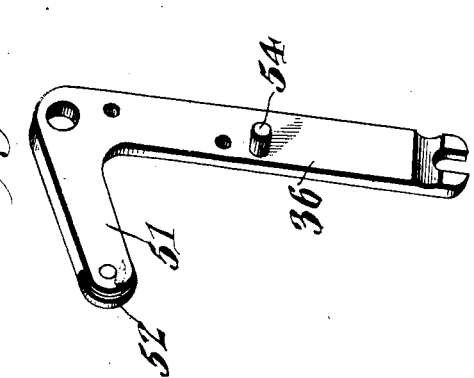
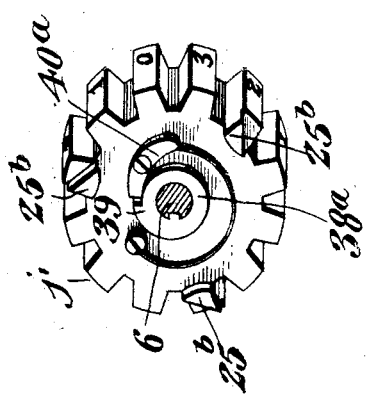
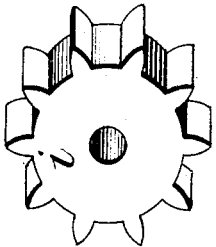
Witnesses
Jas. E. McCathran
Onetta A. Colne
John A. Smith, Inventor
By L. G. Julihn
Attorney J. A. SMITH.
REGISTER FOR ADDING MACHINES.
APPLICATION FILED NOV. 27, 1907.
1,086,410.
Patented Feb. 10, 1914.
18 SHEETS—SHEET 15.
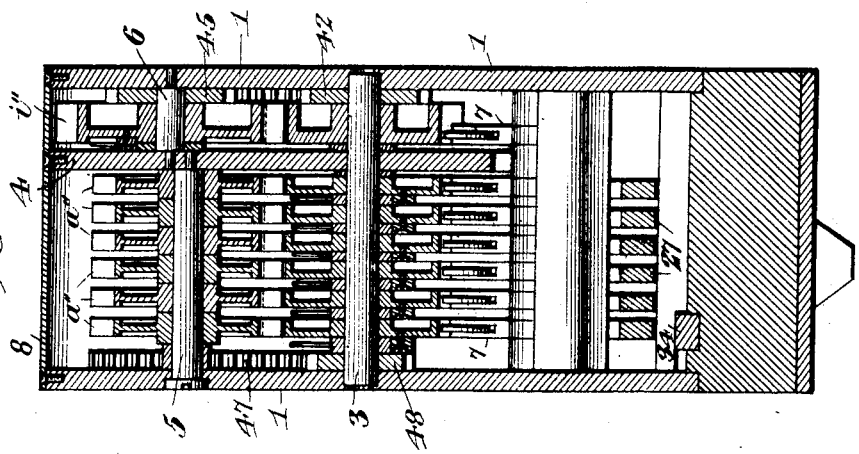
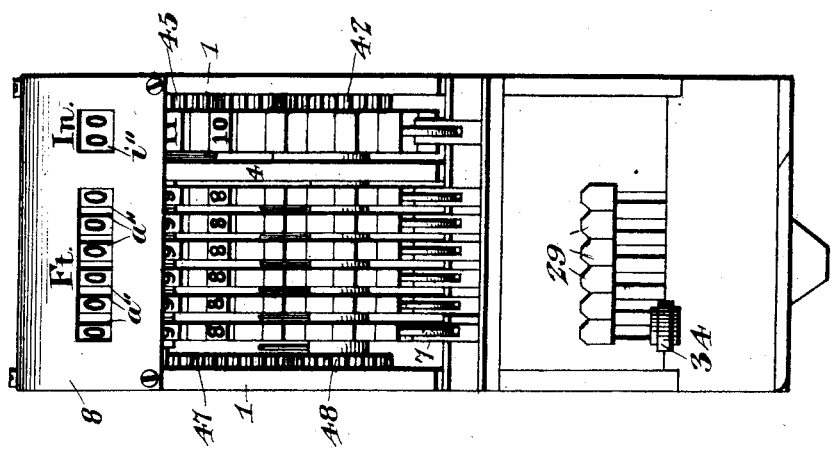
Witnesses
Jas. F. McCathran
Doretta A. Cohee
John A. Smith, Inventor
By L. G. Julihn
Attorney

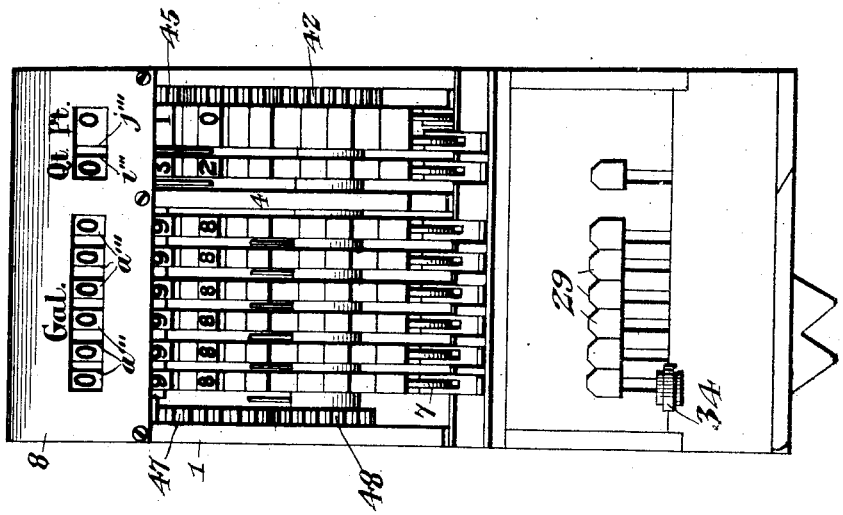
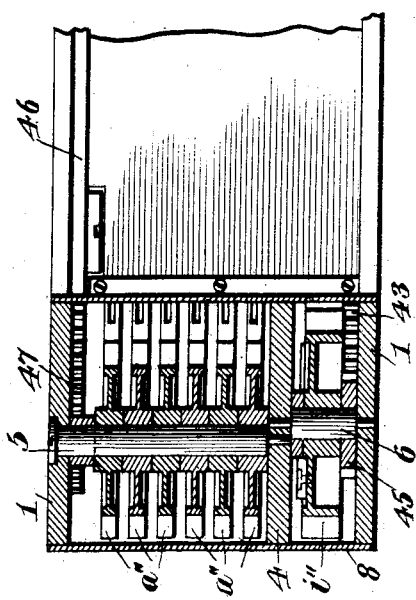
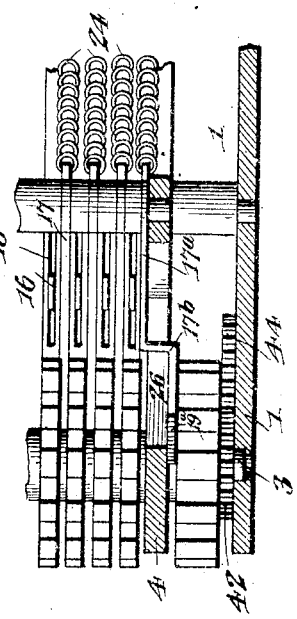

J. A. SMITH.
REGISTER FOR ADDING MACHINES.
APPLICATION FILED NOV. 27, 1907.
1,086,410.
Patented Feb. 10, 1914.
18 SHEETS—SHEET 17.
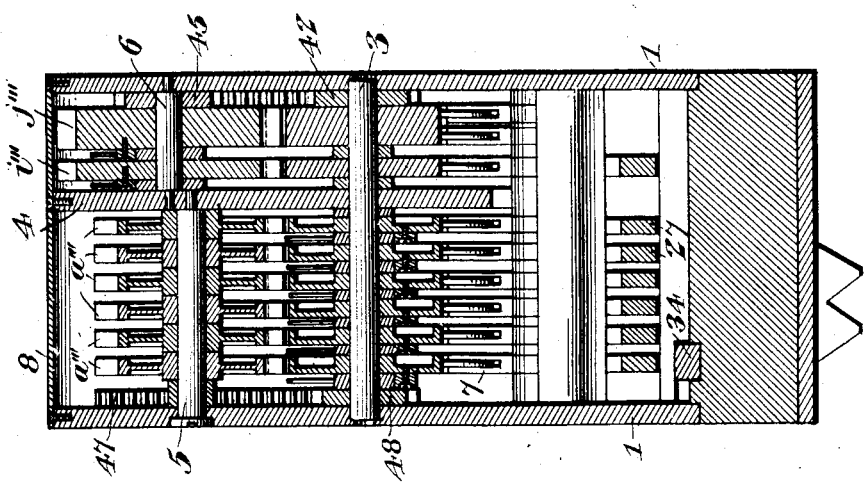

J. A. SMITH.
REGISTER FOR ADDING MACHINES.
APPLICATION FILED NOV. 27, 1907.
1,086,410.
Patented Feb. 10, 1914.
18 SHEETS—SHEET 18.
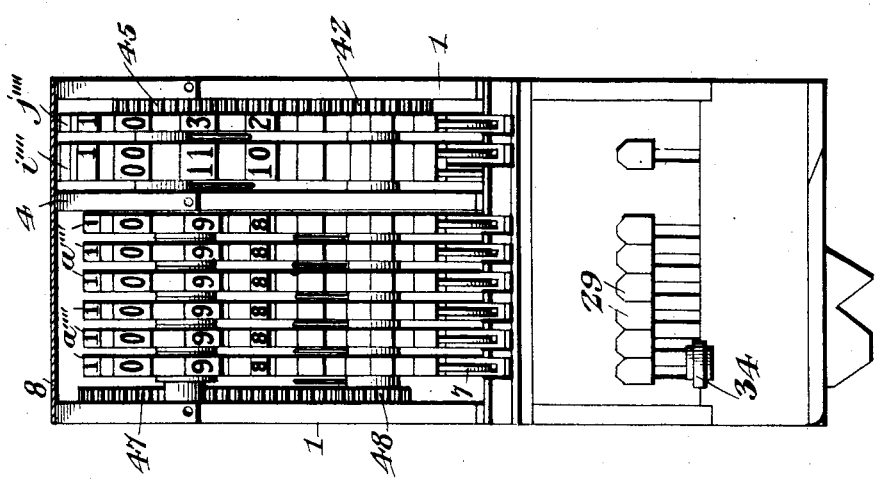
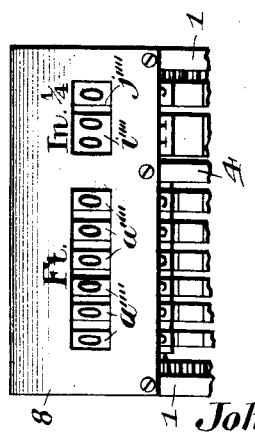
John A. Smith, Inventor

UNITED STATES PATENT OFFICE.

JOHN ASBURY SMITH, OF HARRISBURG, PENNSYLVANIA, ASSIGNOR TO ELLIOTT-FISHER COMPANY, OF NEW YORK, N. Y., A CORPORATION OF DELAWARE.

REGISTER FOR ADDING-MACHINES.

1,086,410.  Specification of Letters Patent.  Patented Feb. 10, 1914.

Application filed November 27, 1907. Serial No. 404,020.

*To all whom it may concern:*

Be it known that I, JOHN ASBURY SMITH, a citizen of the United States, residing at Harrisburg, in the county of Dauphin and State of Pennsylvania, have invented a new and useful Register for Adding-Machines, of which the following is a specification.

My present invention relates to registers or totalizers, and more particularly to a totalizing and registering mechanism adapted for use as a component part of a combined typewriting and adding machine, such for instance, as the Elliott-Fisher billing machine of commerce, exemplified in Patents Nos. 820,879 and 829,971 to Laganke and Smith.

It may be stated by way of premise that there are two general classes of addition. One of these classes involves uniform denominational values, as for instance the decimal system, wherein the limit of value of each denomination is ten, the unit of value of each denomination being thus ten times the unit of value of the denomination of next lower order. The other class of addition involves non-uniform denominational values, for instance, the English currency system, wherein the denominations are designated farthings, pence, shillings and pounds, and have limits of value of four, twelve, twenty and ten, respectively. Other instances of the non-uniform class are the liquid measure, to-wit, pints, quarts and gallons, the denominational values being two, four and ten, respectively, and the linear measure, to-wit, feet and inches, having denominational values of twelve and ten, respectively; also the linear measure extended to fractions, as for instance, quarter inches, inches and feet, the progressive values of these denominations being four, twelve and ten, respectively. In the patents already identified is disclosed a totalizing or registering mechanism arranged for mechanical addition in accordance with the uniform decimal system, the limit of value being transferred to the next higher denomination whenever ten units of value are accumulated in any given denomination.

The object of my present invention is to produce a totalizer or register which, with slight modification, may be adapted for any one of several kinds of addition of what I have designated as the non-uniform class, to-wit: addition in which the denominations have different limits of value and therefore require the accumulation of different unit values in different denominations prior to the carrying operation.

A further object of the invention is to produce a totalizer or register which, while capable of mechanically performing non-uniform addition, will, nevertheless, be operable by a master actuator relatively movable in a rectilinear path to different denominational positions and having a fixed or constant unit of rotary movement.

Subordinate to this general object, the invention is directed to a novel construction and arrangement of parts designed to provide against every contingency which could, by any possibility, result in erroneous computations.

Figure 4:
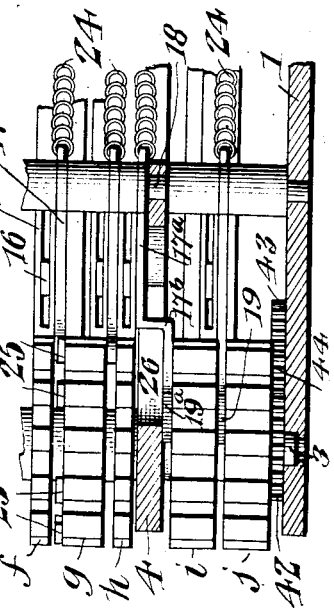
Figure 7:
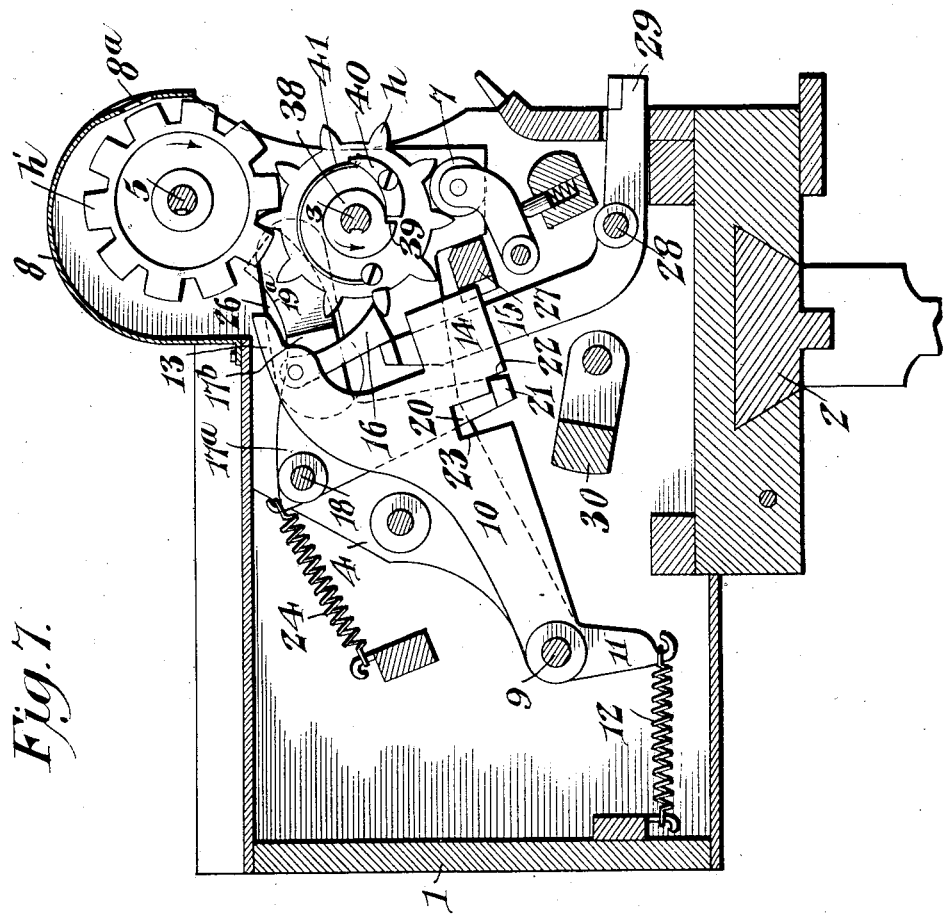
Figure 8:
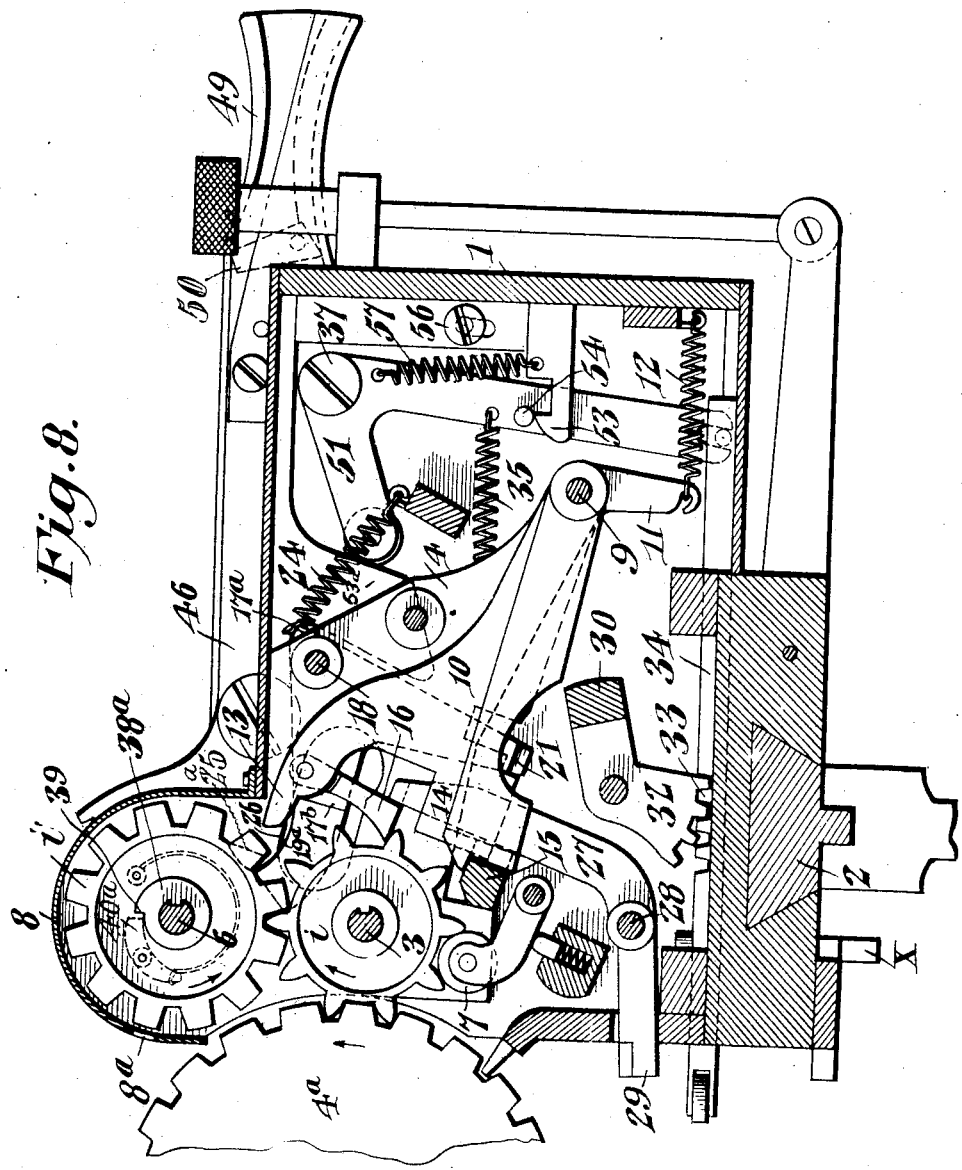
Figure 9:
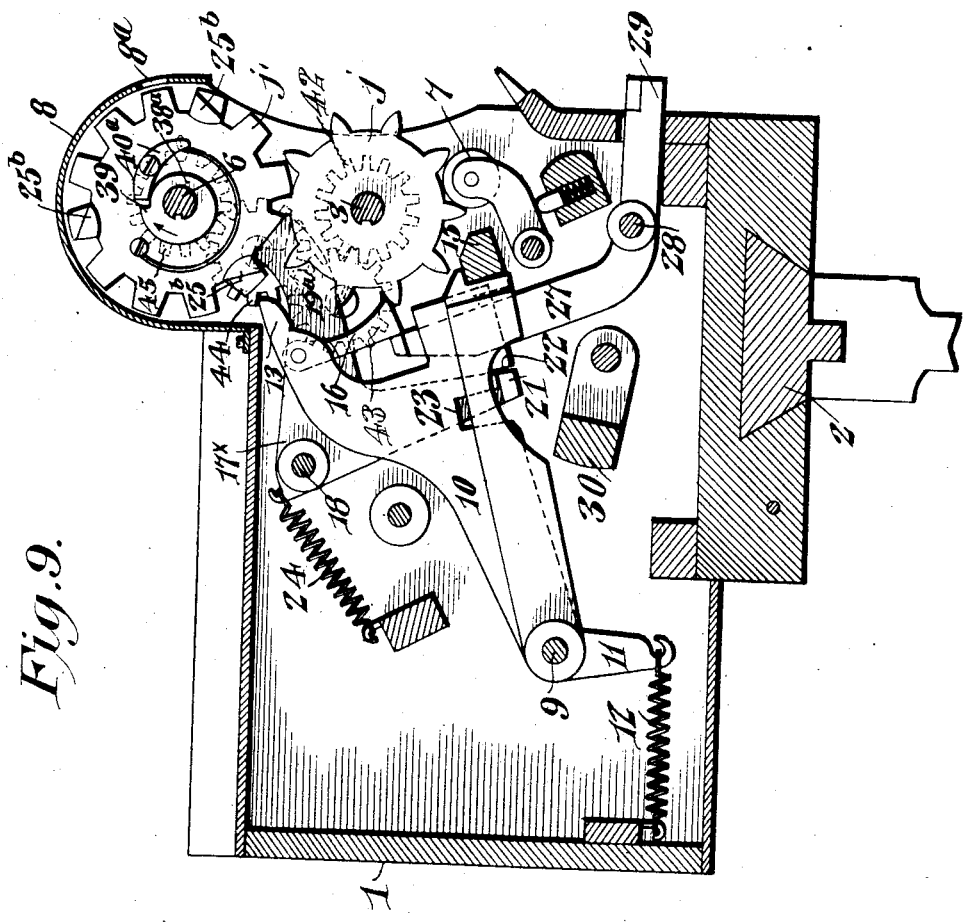
Figure 10:
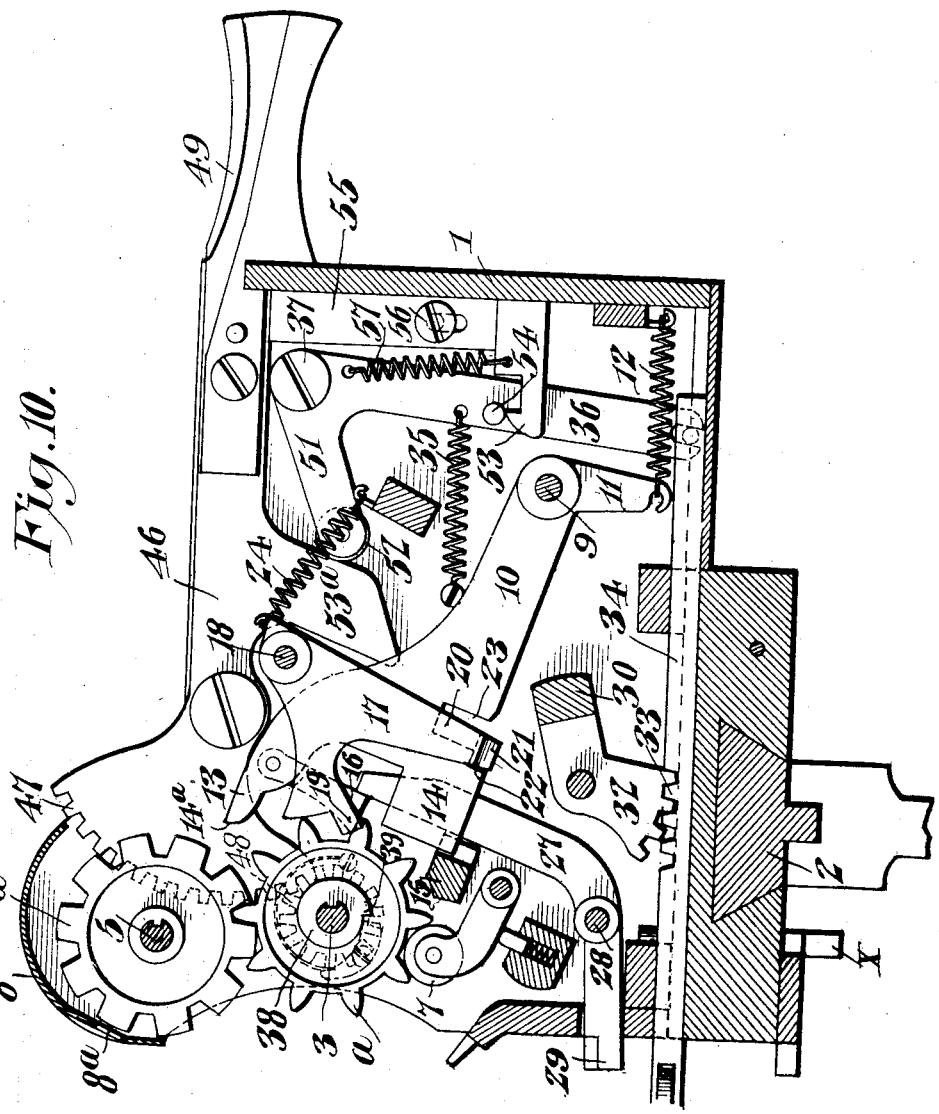
Figure 11:
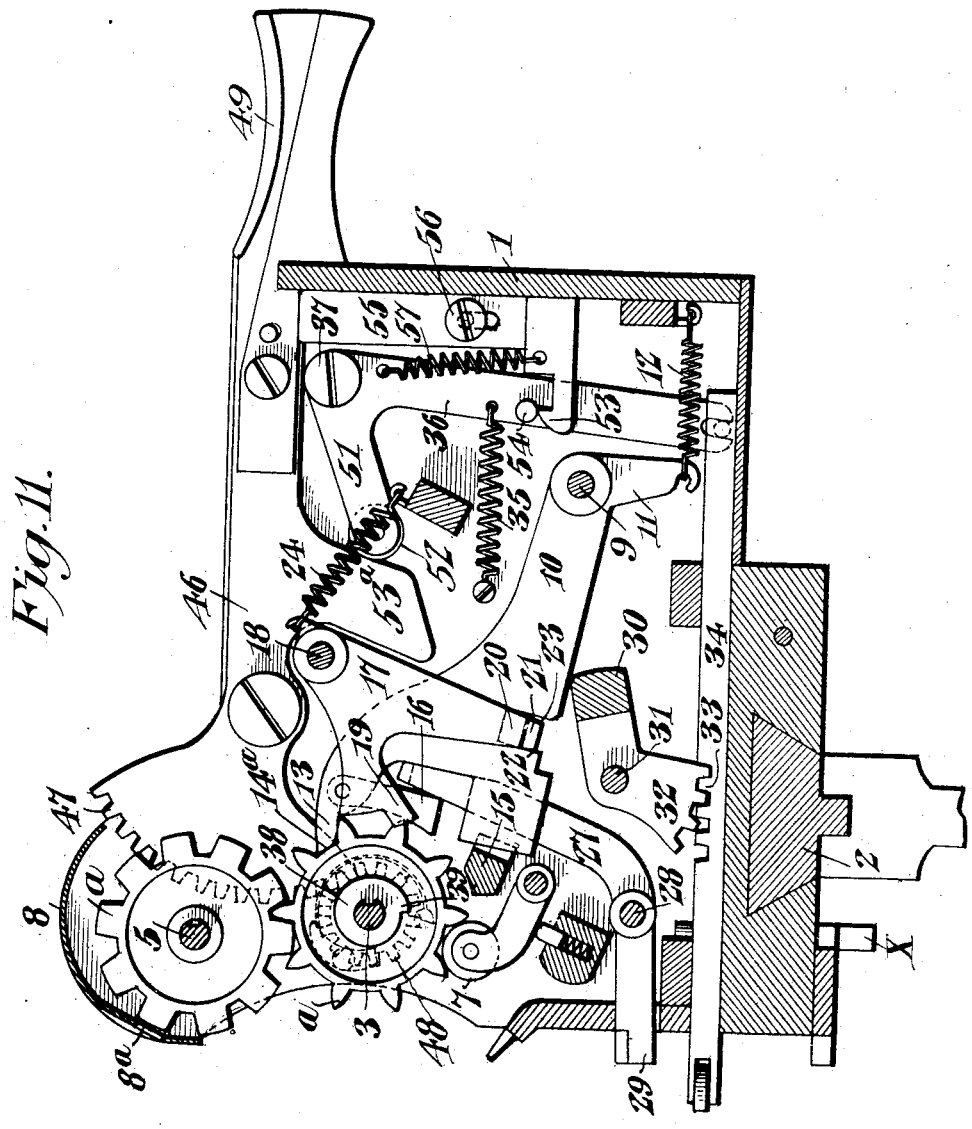
Figure 12:
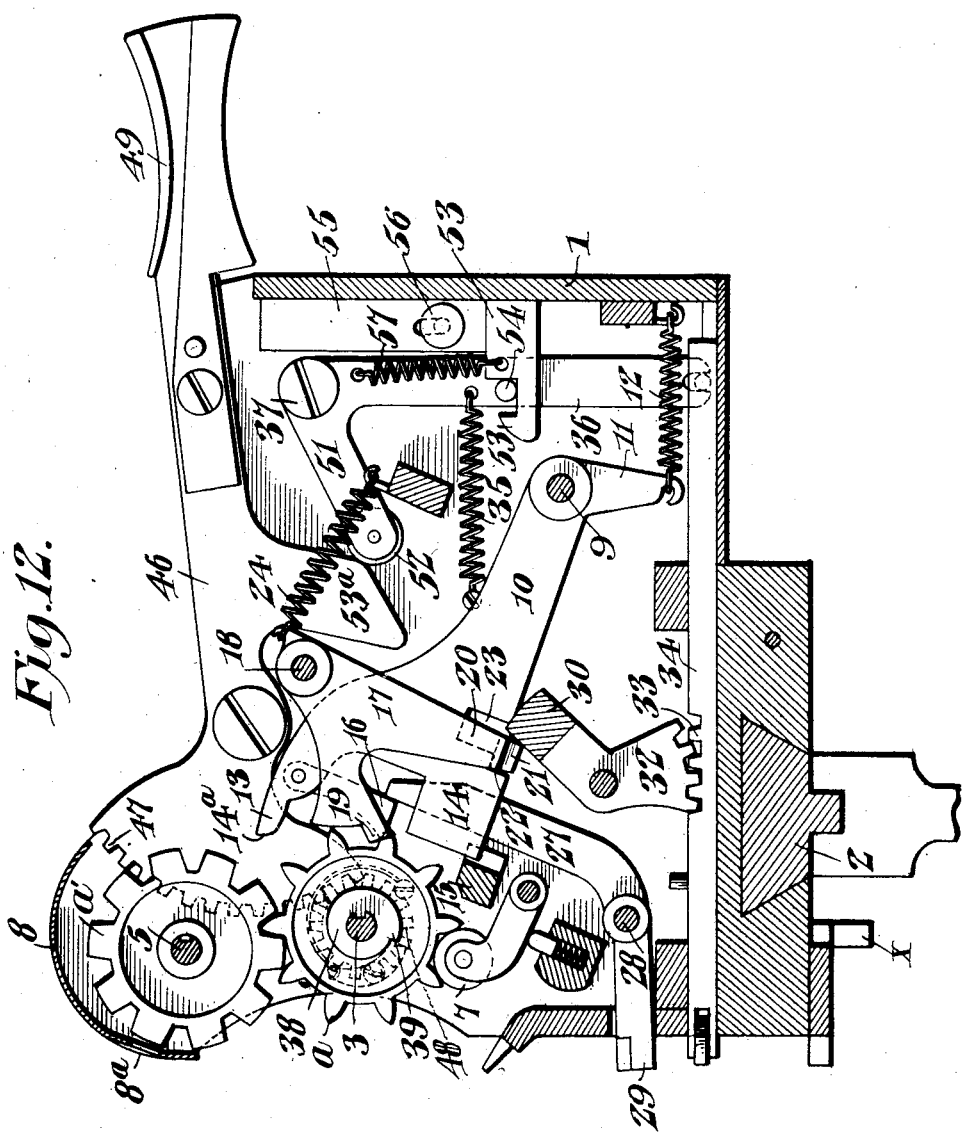

In the accompanying drawings—Figure 1 is a front elevation of the register. Fig. 2 is a similar view with a portion of the casing removed. Fig. 3 is a plan view of the same with the top of the casing removed. Fig. 4 is a fragmentary plan view, partly in section, designed more particularly to show the mechanism whereby the pence wheel controls the operation of the mechanism for advancing or carrying the adjacent shillings wheel. Fig. 5 is a vertical sectional view of the register showing the relation of the various wheels. Fig. 6 is a horizontal section through a portion of the register, showing the relation of the various registering wheels. Fig. 7 is a section on the line 7—7 of Fig. 5. Fig. 8 is a sectional view on the line 8—8 of Fig. 5, seen from a point of view opposite that of Fig. 7. Fig. 9 is a view similar to Fig. 7, the section being taken on a line at the opposite side of the partition between the pence and shillings wheels. Fig. 10 is a section similar to Fig. 8, but taken at the opposite side of the partition on the line 10—10 of Fig. 5. Fig. 11 is a section similar to Fig. 10, showing a selector and a carrying device in the positions they assume after they have been operated to advance a registering wheel. Fig. 12 is a section similar to Fig. 11 with the resetting lever elevated sufficiently to reset the operated transfer device and selector. Fig. 13 is another section similar to Fig. 12, showing the positions assumed by the parts after the lever has been farther elevated to permit the rocker to move back sufficiently to accommodate the backward movement of the selectors during the subsequent resetting of the wheels. Fig. 14 is another section showing the resetting lever thrown up to completely reset the wheels and showing the selectors thrown back by the projections on the wheels during the resetting of the latter. Fig. 15 is a detail view of the resetting train of gearing for the farthings and pence wheels. Fig. 16 is a detail perspective view of the register dividing plate or partition. Figs. 17, 18 and 19 are detail perspective views of the several forms of selectors employed. Fig. 20 is a detail perspective view of one of the pound wheels. Fig. 21 is a similar view of the shilling wheel. Fig. 22 is a detail perspective view of the pence wheel. Fig. 23 is a detail view of the farthings wheel. Fig. 24 is a detail view of the idler which engages the shilling wheel of highest denomination. Fig. 25 is a detail view of one of the idlers for the pound wheels. Fig. 26 is a detail view of one of the idlers at the right of the partition, to-wit, one of the idlers for the farthings or pence wheels. Fig. 27 is a detail perspective view of the lever for operating the rocker-actuating slide. Fig. 28 is a detail view of the controlling catch or stop for the lever shown in Fig. 27. Fig. 29 is a front elevation of a modified construction designed for the addition of feet and inches. Fig. 30 is a vertical sectional view of the same. Fig. 31 is a horizontal section through the front end of the register. Fig. 32 is a horizontal section in a somewhat higher plane than Fig. 31 of the right hand side of the register. Fig. 33 is a front elevation of another modified construction adapted for addition according to the liquid measure, to-wit, gallons, quarts and pints. Fig. 34 is a vertical sectional view thereof. Figs. 35 and 36 are horizontal sections of the same construction. Fig. 37 is a front elevation of the upper portion of still another modified form of register arranged for addition in accordance with the linear measure extended to fractions, to wit, feet, inches and quarter inches, and Fig. 38 is a front elevation of the same register with a portion of the casing removed.

Each part is designated by the same reference character throughout the drawings.

Referring first more particularly to Figs. 1 to 28 inclusive which illustrate a register for English currency values, 1 indicates the casing of the register supported upon a bar 2 which, in the contemplated use of the device, is mounted on the frame of what is known as a flat platen or book typewriter, shown in the patents hereinbefore identified. Within the casing, adjacent to the front side thereof, is journaled a transverse shaft 3, which is normally stationary, and supports an alined series of idlers $a, b, c, d, e, f, g, h, i$ and $j$, in the form of wheels each having ten equidistant peripheral teeth. The alinement of the idlers $a, b$, etc., permits a toothed master wheel or actuator $4^a$, a segment of which is shown in Fig. 8, to be advanced laterally into mesh with each successive idler and to be rotated for the purpose of rotating the idler engaged by said wheel.

It is unnecessary for the purpose of the present invention to show and describe the mechanism whereby the wheel 4 is shifted across the series of idlers and rotated to operate the idlers engaged. It may be stated in passing, however, that in the contemplated use of the register, with which the present invention is directly concerned, the master wheel is moved laterally with a typewriter carriage and is rotated by the numeral keys of the typewriter through suitable intermediate connections, to the end that when a key is depressed to print a given digit in a given denominational order of a column on the work sheet, the idler of corresponding denomination will be rotated a number of increments or units of movement corresponding to the value of the digit printed.

The immediately foregoing statement will be more fully understood by reference to the patents hereinbefore identified.

The several idlers engage and operate the registering wheels $a', b', c', d', e', f', g', h', i'$ and $j'$. The registering wheels are enmeshed with the idlers at all times, and displayed thereon and preferably upon the outer faces of the teeth thereof are suitable digits or numerical designations. The six wheels of highest denomination, to-wit, the wheels $a'$ to $f'$ inclusive, may be termed the pound wheels, since they register amounts expressed in pounds, to-wit, units, tens, hundreds, thousands, ten-thousands and hundred-thousands of pounds, beginning with the wheel $f'$ at the right hand end of this group. The next two wheels to the right register amounts in shillings, the wheel $h'$ registering units and the wheel $g'$ tens of shillings. The shillings and pounds wheels are separated by an interval to facilitate the reading of the total, and it will be noted that the idler $g$ meshing with the tens of shillings wheel $g'$ is consequently of double width.

Each of the pound wheels $a'$ to $f'$ inclusive, and the units of shillings wheel $h'$, displays upon its periphery the digits 0 to 9 inclusive, while the tens of shillings wheel $g'$ displays five series of digits each including 0 to 1, and each of said wheels, to-wit, $a'$ to $h'$ inclusive, has ten teeth corresponding to the spaces of the idlers, so that one complete rotation of any idler, except the two at the extreme right hand end of the series, will effect one complete rotation of the shilling or pound wheel to which motion is thus transmitted. The next registering wheel $i'$, to the right of the shilling wheels, registers amounts expressed in pence and will therefore be termed the pence wheel. This pence wheel, like the pound wheels, is spaced from the shilling wheels to facilitate the reading of the amount registered, and differs from the pound and shilling wheels in four essential particulars. In the first place, it is provided with twelve teeth instead of ten, since there are twelve pence in a shilling. In the second place, this wheel is of greater diameter than the shilling wheels, since it has twelve units of movement instead of ten, and each unit necessarily corresponds in extent to the unit of movement of either the shilling or pound wheels. That is to say, the spacing of the teeth on all wheels must be the same, since all of the idlers are uniform, but the diameter of the pence wheel must be increased to accommodate the two additional teeth which it necessarily possesses. In the third place, the pence wheel is of double width, because two digits are required to express some of the values to be registered thereon. Lastly, the pence wheel differs from the shilling and pound wheels in this, that the numerical designations exhibited on its periphery range from 1 to 00, including 1 to 11, and the 00 representing 12, which amount however is not exhibited on the pence wheel, but is instead carried to the adjacent shilling wheel and exhibited thereon, as will be more fully described. The last wheel to the right, to-wit, the wheel of lowest order, $j'$, is the farthing wheel. In structural characteristics this wheel is like the pence wheel $i'$, having twelve teeth and being of double width. The numerical designations exhibited on its periphery, however, are divided into three similar groups or series, each ranging from 0 to 3, that is to say, each series of four teeth exhibiting 1, 2, 3 and 0, since the value of one pence is four farthings, which amount, however, is not exhibited on the farthings wheel, but is carried to and exhibited upon the pence wheel, as the last digit or 0 of either series arrives at the reading line.

Attention is now directed to the fact that since all the idlers are necessarily disposed in alinement, to be engaged by a master wheel having a rectilinear lateral movement, the registering wheels, all of which mesh with the idlers, cannot be mounted coaxially, because said registering wheels vary in diameter. Because of this consideration, the casing 1 of the register is subdivided into two longitudinal compartments by a vertical dividing wall or partition 4. In the left hand compartment all of the registering wheels having ten teeth and of like diameter, to-wit, the shilling and pound wheels, are loosely mounted on a shaft 5 suitably journaled in the left hand wall of the casing and in the partition 4, but normally held stationary by means to be described. The two larger wheels having twelve teeth, to-wit, the farthing and pence wheels, are mounted in the right hand compartment of the casing upon a shaft 6 journaled in the right hand wall of the casing and in the partition 4, but normally stationary. The shafts 5 and 6 are arranged out of alinement, as clearly shown in Fig. 5, the arrangement being such that the several registering wheels will properly mesh with the alined idlers and will present the end faces of the several teeth at the reading line in substantially the same plane and in proper alinement, as shown in Figs. 1 and 2. The character or characters exhibited on one tooth of each registering wheel is exhibited at one or more sight openings 8ª in a coverplate 8 of the register, as shown in Fig. 1.

For the purpose of yieldingly holding the several wheels, suitable spring-urged locators are mounted in the casing and engaged between two teeth of each idler. These locators insure the proper positioning of the wheels to properly aline the digits thereon at the sight opening. It will now be seen that when a digit or number is printed in a given denominational position of a column, the registering wheel of corresponding denomination will be rotated a number of increments or tooth spaces corresponding to the value of the number or digit printed. This will cause the wheel to register the number at the reading line, so that, when several wheels have been operated, they will exhibit an amount or total which will represent the value accumulated on the register. In registering successive numbers, however, it is evident that the limit of value of any particular wheel may be exceeded. For instance, if three farthings have been registered, the printing of another farthing in the column will cause the farthing wheel to be moved one increment, thus presenting 0 at the reading line, instead of 4. This amount, however, must be registered, and that result is accomplished by what is termed carrying mechanism, to-wit, mechanism whereby, when the limit of value of a given denomination is reached, such value will be transferred to and exhibited upon the wheel of next higher order. Thus, in the example given, the accumulation of the additional farthing will present a 0 on the farthing wheel at the sight opening and the carrying mechanism will automatically operate to advance the pence wheel one increment and thus exhibit one pence thereon, to-wit, the sum of the several farthings accumulated by the movement of the farthing wheel.

The several devices constituting the carrying mechanism for the various registering wheels are not identical in construction, the variation being necessitated by reason of the different dimensions and mountings of the wheels. I shall therefore first describe the carrying mechanism whereby the transference of values from one to another of the wheels located in the left hand compartment is effected.

Disposed transversely of the casing 1, adjacent to the rear end thereof, is a bar 9 upon which are mounted to swing a series of transfer levers 10, each having a depending arm 11 to which is connected one end of a spring 12 constituting a transfer motor and having its opposite end attached to the back wall of the casing 1, see Fig. 10. The front end of each transfer lever 10 is bifurcated to produce forwardly extending upper and lower arms 13 and 14, the latter being guided in a kerfed transverse guide-bar 15. The arm 13 is formed with a locking end $14^a$ and pivotally suspended from said arm is a transfer dog 16 arranged to extend over a tooth of one of the idlers, so that, upon the depression of the lever, said idler will be turned one increment, thus imparting a single increment or unit of advance to the registering wheel with which the idler is in mesh. The transfer lever, which serves or advances any given idler, is controlled by the idler of next lower order, since it is obviously necessary that when a given wheel reaches the limit of its value, it will cause the release of a transfer lever to advance the adjacent wheel of higher order. To effect this control of the several transfer levers, a series of selectors 17 are mounted to swing from a bar 18 extending transversely of the casing above the levers. Each selector is bifurcated to produce a forwardly extending contact plate 19 and a downwardly extending detent or holding arm 20. The holding arm 20 is provided at its lower end with an angular flange 21, see Figs. 10 and 19, which flange extends under the lower edge of the adjacent transfer lever to the left and abuts against a shoulder 22 with which said lever is formed. Each transfer lever is also formed with a notch or opening 23 extended upwardly from its lower edge and of sufficient width to receive the flange 21 of the selector when said flange is brought opposite the notch by the backward swinging of the selector from its normal position to the position shown in Fig. 11. Each selector 17 is yieldingly retained in its normal position by a spring 24 and is swung backward to release the transfer lever by the idler immediately to the right of the one served or advanced by the lever. To effect this operation of the selector at the proper time, its front end or contact plate 19 is extended between the idler served by the lever and the one to the right thereof, and said idler to the right of the selector is provided upon its left hand side face with one or more trips 25, clearly shown in Figs. 24 and 25. As any given idler within the left hand compartment of the casing is given that increment of advance which presents the 0 to its registering wheel at the reading line, one of the projections or trips 25 of said idler engages the contact plate of a selector 17 and swings the latter, against the resistance of its spring 24, to effect the release of the adjacent transfer lever and thus permit the lever to drop, under the impulse of gravity and the spring 12, to effect a single increment of advance of the registering wheel of next higher order. As the idler advanced by the transfer lever rotates, the tooth above the one engaged by the transfer dog 16 will engage said dog and swing the same out of engagement with the wheel. This disengagement of the dog, however, will not permit the wheel to come to rest before it has completed its movement, for the reason that said wheel will be positively and accurately positioned by the action of its locator 7 and also by the action of the locking end $14^a$ of the transfer lever, which, when swung down, will be engaged between two teeth of the idler, as shown in Fig. 11, thus insuring the full movement of the idler and locking the same securely against further movement in either direction, as long as the lever remains depressed. Before passing from this description of the carrying mechanism for the wheels located in the left hand compartment of the casing, attention may be directed to the fact that each of the idlers $a$ to $h$ inclusive, is provided with a single trip, as shown in Fig. 25, with the exception of the idler $g$, which is provided with five trips, as shown in Fig. 24, for the reason that this idler operates the tens of shillings wheel, the limit of value of which is two, so that, upon the completion of each second increment of movement of such wheel, the value accumulated thereon will be transferred to the units of pounds wheel $f'$.

It now remains to describe the mechanism whereby the carrying or transfer of values is effected by the wheels located in the right hand compartment of the casing, to-wit, the pence and farthing wheels, $i'$ and $j'$. The manner of transferring values from the pence wheel to the shilling wheel of lowest order, to-wit, from the wheel $i'$ to the wheel $h'$, is effected in a manner similar to that described in connection with the other wheels, by mechanism clearly shown in Figs. 7 and 8. The only difference resides in the construction and arrangement of the selector controlling the transfer. This selector $17^a$, see particularly Figs. 4, 7, 8 and 17, is identical with the other selectors, except that its forwardly extending arm $17^b$ is deflected laterally through an opening 26 in the partition plate 4, and its contact plate $19^a$, unlike the plates 19 of the other selectors, is extended upwardly between the left hand face of the pence wheel $i'$ and the adjacent wall 4 in order to present said plate $19^a$ in the path of a projection or trip $25^a$ on the side of the pence wheel, see particularly Figs. 4 and 22. The pence wheel rotating in the direction of the arrow in Fig. 8, presents the lug $25^a$ to the inclined upper end of the plate $19^a$ and depresses the latter to swing back the selector $17^a$ as the pence wheel is moving from 11 to 00. This causes the release of the transfer lever controlled by said selector and said lever operates to move the units of shillings wheel $h'$ one increment to transfer thereto the amount accumulated by the pence wheel.

The mechanism for transferring values from the farthing wheel $j'$ to the pence wheel $i'$ is identical with that just described for transferring from the pence wheel to the units of shillings wheel, with the exception, see Fig. 9, that the selector $17^x$, operated by the farthings wheel, is not laterally deflected, and except further that the farthing wheel is provided with three projections or selector-operating trips $25^b$, since the farthing wheel carries three series of digits, four increments of movement of said wheel, or one-third of its complete rotation, representing its limit of value and necessitating the transference of the value to the pence wheel.

From what has been said, it will be noted that all of the transfer levers 10 are similarly constructed and transmit motion to the respective idlers, except the one of lowest order, which of course is never carried. It will also be noted that all of the selectors controlling the transfer from one to another of all of the wheels within the left hand compartment of the casing are operated by idlers, while on the contrary, the selectors $17^x$ and $17^a$, which control the carrying of values from the farthing to the pence wheel and from the pence wheel to the units of shillings wheel, are operated not by idlers, but by the registering wheels themselves. This variation in the operation of the selectors is made necessary by reason of the fact that whereas each idler to the left of the partition corresponds in dimensions with the registering wheels operated thereby, the idlers to the right of the partition 4 are smaller in diameter than the registering wheels engaged by them, and this variation precludes the possibility of operating the selectors $17^x$ and $17^a$ from the idlers $j$ and $i$, and renders it necessary to effect their operation by the farthing and pence wheels instead. To insure the proper engagement of the transfer dogs 16 with the idlers, a series of rockers or levers 27 are mounted on a transverse bar 28 the upper end of the rocker being disposed behind a transfer dog, as shown in Fig. 10, and the front end 29 of the rocker being extended through the front of the casing for actuation by a projection on the typewriter, as described in the patents to which reference has been made.

When a number has been added to the amount already accumulated on the register, certain or all of the transfer levers 10 will be in their depressed or operated positions, shown in Fig. 11, and it is obviously necessary to reset the transfer mechanism before the wheels are again operated. For this purpose a transfer lever resetting or retracting rocker 30 is mounted to swing from a shaft 31 below the transfer levers 10 and is provided with a segmental rack 32 engaging a rack 33 formed in a rack bar or slide 34 mounted to reciprocate longitudinally of the casing at the bottom thereof and extended through the front of the casing 1 to be operated by a projection on the typewriter carriage as the latter is retracted. It will be noted that by moving the slide 34 rearwardly, from the position shown in Fig. 11 to that shown in Fig. 12, the rocker 30 will be swung to first elevate the depressed transfer levers and to then engage the flanges 21 of the previously operated selectors and shift said selectors positively to their normal positions, as shown in said figure, if, by any chance, the springs 24 should fail to properly perform their functions. Having reset the transfer levers, the rocker 30 is retracted to its normal position, shown in Fig. 10, by a retracting spring 35 connected at one end to the casing 1 and at its opposite end to a lever 36 fulcrumed as indicated at 37, near the top of the left hand wall of the casing and connected at its lower end as by a pin and slot connection to the slide 34. The described mechanism comprehends all of the parts which are essential to the accumulation of a total on the register.

I shall now proceed to describe as briefly as possible the mechanism whereby the register may be reset to zero preparatory to the accumulation or addition of another amount.

Fixed upon the shaft 3 and alternating with the idlers located in the left hand compartment of the casing are a series of resetting cams 38, see Figs. 5 and 7. Each of these cams is provided with a shoulder 39, the several shoulders being disposed in alinement. Mounted on the left hand side of each of the idlers in the left hand compartment, to-wit, the idlers $a$ to $h$ inclusive, is a resetting pawl or dog 40 urged toward the periphery of the adjacent cam by a spring 41. When the wheels are all at zero the pawls are in alinement and are slightly in advance of the shoulders of the several cams 38. When the idlers referred to are operated, the resetting dogs 40 carried thereby will traverse the outer faces or peripheries of the cams and when a total is accumulated on the register these dogs will be in various positions relative to the shoulders 39, according to the various digits displayed at the reading line. It will be evident, however, that by rotating the shaft 3 in the direction of the arrow in Fig. 7, the cams will be carried around until the shoulders thereof pick up the resetting dogs, after which the cams will rotate the idlers, to reset the same. One complete rotation of the shaft 3 serves to pick up all of the dogs, and since all the shoulders are in alinement, all the dogs will be in alinement, and their wheels will be in their normal zero positions at the completion of the resetting operation.

The registering wheels in the right hand compartment of the casing cannot be reset through the medium of the idlers as are the registering wheels in the left hand compartment. This is for the reason that the registering wheels $i'$ and $j'$ are of greater diameter than the idlers $i$ and $j$ and therefore could not be returned to zero by one complete rotation of said idlers. For this reason the shaft 6 which supports the registering wheels $i'$ and $j'$ is provided with resetting cams $38^a$ having shoulders 39 arranged to engage resetting pawls or dogs $40^a$ mounted on the left hand side faces of the farthing and pence wheels and similar in all respects to the dogs 40 mounted on the idlers at the other side of the partition. (Compare Figs. 7 and 9.)

In order to effect the simultaneous resetting of all of the registering wheels to zero, it is necessary to simultaneously impart a complete rotation in opposite directions to the shafts 3 and 6. The power is applied, in a manner to be described, to the shaft 3 and is transmitted to the shaft 6 by what may be termed the resetting train of gears, indicated in dotted lines in Fig. 9, and shown in full lines in Fig. 15. This train of gears includes a spur gear 42 keyed to the right hand end of the shaft 3 and geared through intermediate idlers 43 and 44, to a similar gear 45 keyed upon the right hand end of the shaft 6. Thus, when the shaft 3 is rotated to cause the cams thereon to reset the registering wheels in the left hand compartment through the medium of the idlers, the shaft 6 will be operated from the shaft 3 by the resetting train to cause the cams $38^a$ to pick up the dogs $40^a$ and thus reset the wheels in the right hand compartment, to-wit, the farthing and pence wheels.

To impart the necessary rotary movement to the shaft 3, a resetting lever 46 is fulcrumed at the left hand side of the casing and is provided at its front end with a toothed segment 47 meshing with a gear wheel 48 keyed to the shaft 3 at the left hand end thereof, see Figs. 2 and 11. The lever 46 is extended rearwardly from the casing to form an operating handle 49, and being held securely in its normal position by a latch 50, indicated in dotted lines in Fig. 8, serves to hold the shafts 3 and 6 normally stationary so that the latter will not be displaced by the rotation of the wheels thereon. By reference to Figs. 11 to 14 inclusive, it will be seen that by swinging the resetting lever 46 from its normal position, shown in Fig. 11, to the limit of its movement, shown in Fig. 14, the shafts 3 and 6 will be caused to make slightly more than one complete rotation to effect the resetting of the wheels, and the depression of the lever to its normal position will then restore the shafts and resetting cams to their normal positions without reversely rotating the wheels, which will be held against such reverse rotation by their locators. It frequently happens, however, that when it is desired to reset the register, some of the transfer levers will be in the depressed positions shown in Fig. 11. It is therefore necessary, prior to the resetting of the wheels, to reset the transfer mechanism and thus unlock the wheels. Furthermore, it will be apparent that during the resetting of the wheels all of the selectors will be thrown back. In view of these considerations, mechanism is provided whereby when the resetting lever 46 is operated, the rocker 30 will first move from the position shown in Fig. 11 to that shown in Fig. 12, for the purpose of resetting any previously operated transfer levers 10 and selectors 17, $17^a$ and $17^x$, this operation being completed before the wheels have moved any appreciable distance. The rocker 30 will then move back slightly to the position shown in Fig. 13, so as to allow the backward swinging of the selectors by the wheels during the resetting thereof, without, however, permitting the transfer levers to drop when released by said selectors, as shown in Fig. 14. Finally, when the wheels have been completely reset, the retraction of the resetting lever will cause the rocker to again move forward to positively reset the selectors thrown back during the resetting of the wheels, after which the rocker will be returned to its normal position, leaving the various parts of the register in the positions shown in Fig. 10.

The means whereby the operation of the resetting lever 48 will cause the performance of the stated functions by the rocker 30 will now be described.

Extended forwardly from the fulcrum 37 of the lever 36 is the short arm 51 of said lever, provided at its extremity with a roller 52 engaged by a cam projection $53^a$ depending from the lever 46. As the lever 46 is elevated, the cam 53 will depress the arm 51 of the lever 36, thus causing the latter to swing back against the resistance of the spring 35 to retract the slide 34 and thus swing the rocker 30 to reset the transfer levers and selectors. This movement of the lever 46 will also permit the rising of a vertically reciprocatory stop 53 to a position in advance of a coöperating pin or stop 54 projecting from one side of the lever 36. This stop 53 is carried at the lower end of a slide 55 held against the left hand wall of the casing by a suitable retainer 56 and normally engaged and held depressed by the lever 46 against the resistance of a spring 57 connected at its lower end to the slide and at its upper end to the lever 36. Normally, the stop 53 is located below the pin 54, as shown in Fig. 11, but, as above stated, the swinging of the lever 46 from the position shown in Fig. 11 to that shown in Fig. 12, and the elevation of the stop 53 by the spring 57 will present the stop 53 in advance of the stop 54, as shown in Fig. 12. The transfer levers and selectors having been reset, the continued elevation of the lever 46 will reset the wheels, but before any of the wheels have moved sufficiently to throw back the selectors, the cam 53ª will be elevated sufficiently to permit the lever 36 to swing back under the impulse of the spring 35. This retraction of the lever 36 by the spring is only partial, however, for the reason that after slight movement of the lever, the latter will be arrested by the engagement of the pin 54 with the stop 53, see Fig. 13, the movement of the lever being just sufficient to permit the retraction of the rocker 30 out of the way of the selectors, but not out of locking relation with the transfer levers.

The continued elevation of the lever 46 resets the wheels and incidentally causes the latter to throw back the selectors, as shown in Fig. 14, the slight retraction of the rocker 30, previously effected, permitting this movement of the selectors, which would otherwise block the complete return of the wheels to zero. As the lever 46 is returned to its normal position, its cam portion 53ª will engage the short arm of the lever 36, as shown in Fig. 13, and will swing the lever back to the position shown in Fig. 12, for the purpose of again moving the rocker 30 to insure the complete resetting of the selectors preparatory to the subsequent operation of the register. Continued depression of the lever 46 will move the cam 53ª out of interfering relation with the arm 51 and will depress the stop 53 out of interfering relation with the pin 54, thus permitting the spring 35 to restore the lever 36, the slide 34, and the rocker 30 to normal position. The parts will then be in the positions shown in Fig. 10.

Attention may be directed to the fact that the typewriter employed in connection with this register will be equipped with eleven numeral keys ranging in value from 1 to 11, instead of nine keys ranging from 1 to 9, as usual, each of the eleven keys being arranged to move the master means from one to eleven increments, according to the key depressed. Attention is also directed to the fact that the register is equipped with three spacing trips $x$, $y$ and $z$, which act in the manner explained in the patents hereinbefore identified, to automatically space the master actuator over such intervals as may intervene between wheels or writing positions. For instance in printing and adding pounds the value of each denomination being ten, the keys 1 to 9 are manipulated in the usual manner to print the digits from one to nine in any denominational position of pounds and to rotate the pounds wheel of corresponding denominational value a number of increments corresponding to the units of value in the digit printed. When the master means passes to the right from the pounds wheel of lowest order the trip $x$ automatically spaces the carriage to present the master means to the tens of shillings wheel from which order the carriage advances as usual to the units of shillings wheel. Therefore it is usual to print first the tens of shillings and then the units of shillings precisely as tens and units of pounds are ordinarily printed. After an amount is printed in the tens of shillings order the trip $y$, which is of double width, causes the master means to pass to a position of engagement with the pence wheel adjacent to the right hand edge of the latter and in printing pence from one to eleven, the corresponding keys are utilized. The trip $z$ then causes the master means to escape to a similar engaging position at the right hand edge of the farthings wheel and the keys one to three are utilized in an obvious manner.

The foregoing is a complete description of that embodiment of the invention disclosed in the first twenty-eight figures of the drawings, to-wit, that embodiment which is adapted for the addition of English currency. Within the purview of the invention, however, the described construction may be modified to adapt it for other kinds of non-uniform addition. For instance, in Figs. 30 to 32 inclusive, is shown a register or totalizer arranged for the addition of feet and inches. This register is precisely like the English register, heretofore described, except that the shillings wheels $g'$ and $h'$ and the farthings wheel $j'$ of the English register, together with the idlers, $g$, $h$ and $j$ thereof and the parts which coöperate with said idlers are eliminated, the transverse dimensions of the right and left compartments of the casing being correspondingly diminished. In other words, the feet and inches register illustrated in Figs. 29 to 32 embraces a single twelve-toothed wheel $i''$ mounted on the shaft 6 at the right of the partition 4 and a series of uniformly spaced ten-toothed wheels $a''$ on the shaft 5 at the left hand side of the partition 4. The wheel $i''$, which may be known as the inches wheel, displays upon its periphery the numbers 1 to 11 and 00, precisely like the pence wheel $i'$ of the construction first described. The wheels $a''$, known as the feet wheels, are of uniform diameter and display the digits 0 to 9 inclusive on their peripheries, precisely like the pounds wheels $a'$ to $f'$ in the English register construction. The mechanism for carrying or transferring values from the inches wheel $i''$ to the wheel $a^2$ of lowest order need not be specifically described, since it is precisely the same as the mechanism heretofore described for carrying from the pence wheel $i'$ to the shillings wheel $h'$ of the English register. So also it is unnecessary to describe the carrying mechanism for transferring values from each wheel $a''$ to the next higher wheel, since this mechanism is identical with that heretofore described for transferring values from one pound wheel to the next. Also the arrangement of idlers for operating the several number wheels and the setting mechanism whereby the number wheels on the respective shafts 5 and 6 are reset to zero is identical with the mechanism described in connection with the English register for resetting the wheels on the respective shafts. In short, the entire construction of the register shown in Figs. 29 to 32 is identical with the English register construction except, as heretofore stated, that the farthings and shillings wheels and their coöperating parts are eliminated.

In Figs. 33 to 36 inclusive is shown a still further modification of the English construction first described. This modification of the mechanism is designed to adapt the register for addition in accordance with the liquid measure, to-wit, gallons, quarts and pints. The construction and arrangement of parts is identical with that of the English construction shown in the first twenty-eight figures of the drawings; with three exceptions: First, the shillings wheels $g'$ and $h'$ and their coöperating parts are eliminated; second, the left hand wheel of the two wheels in the right hand compartment of the casing is of single instead of double width; and third, the carrying periods of the two wheels to the right of the partition are different from the carrying periods of the farthings and pence wheels of the English construction. In other words, on the shaft 6 in the right hand compartment of the casing are mounted two twelve-toothed wheels $i'''$ and $j'''$, while on the shaft 5 in the right hand compartment are mounted a series of equidistant ten-toothed wheels $a'''$. The wheel $j'''$ is the pints wheel, and bears on its periphery six series of characters, each series embracing 1 and 0, the 0 being normally exhibited at the sight opening of the register, as shown in Fig. 33. One increment of movement of this wheel presents the 1 at the sight opening and registers one pint; the next increment of movement of the wheel presents another 0 at the opening and accumulates two pints, which, instead of being registered on the pints wheel, is transferred or carried to the next adjacent or quarts wheel $i'''$. It will therefore be seen that the pints wheel carries every second increment of movement and is therefore equipped opposite every other tooth with a trip lug in a manner similar to the location of these lugs on the shillings wheels in the first form of register described, see Fig. 24. The quarts wheel $i'''$ has displayed upon its periphery three series of digits ranging from 0 to 3. The first three increments of movement of this wheel present in succession the digits 1, 2, 3, before the sight opening as three successive quart values are accumulated on the wheel. The fourth increment of movement presents a 0 at the sight opening and transfers the value of the accumulated four quarts, to-wit, one gallon, to the gallons wheel $a'''$ of lowest order.

As will be seen by reference to Fig. 36, the arrangement of the mechanism for carrying from the left hand wheel in the right hand compartment to the right hand wheel in the left hand compartment of the casing is precisely the same as the corresponding mechanism in the construction first described. The only difference is that the quarts wheel $i'''$ carries three times in each complete rotation thereof and is therefore equipped with three trip lugs the arrangement of which is precisely like the arrangement of the trip lugs $25^b$ on the farthings wheel of the construction first described, see Fig. 23. The gallons wheels $a'''$ correspond in construction and operation to the pounds wheels of the first described construction. It will therefore be seen that in this modified construction shown in Figs. 33 to 36 inclusive, the pints wheel $j'''$ is a twelve-toothed wheel and carries six times in each complete rotation thereof; that the quarts wheel $i'''$ is a twelve-toothed wheel and carries three times in each complete rotation thereof, and that the gallons wheels $a'''$ are ten-toothed wheels and that each carries once in each complete rotation. In all other respects, as for instance in the mode of operating the several wheels and in the mode of resetting the same, this modified form of register is precisely like the form first described.

The last modification, which is shown in Figs. 37 and 38, is designed for addition in feet, inches and quarter inches, and the construction and operation of the mechanism is identical with that of the English register construction first described, except that the shillings wheels $g'$ and $h'$ are eliminated and the right hand number wheel in the right hand compartment of the casing is of single width instead of double width. Thus the wheel $j''''$, which is the quarter inch wheel, displays three series of digits ranging from 0 to 3, and carries three times in each complete rotation. The wheel $i''''$ is the inches wheel and like the wheel $j''''$ has twelve teeth. Instead of carrying three times in each complete rotation, however, it carries once to the adjacent feet wheel $a''''$, it being understood that the wheels $a''''$ correspond in construction and operation to the pound wheels of the first described construction in that they are arranged in alinement, are equipped with ten teeth, and carry once in each complete rotation. In short, this last modified construction is identical with that of the English register illustrated in the first twenty-eight figures of the drawings, except, as already stated, that the shillings wheels are omitted, and except further that the wheel $j''''$ is of single instead of double width.

It is thought that from the foregoing, the construction and operation of the several forms of my invention herein described and illustrated will be clearly comprehended. It should be distinctly understood, however, that I reserve the right to effect such changes, modifications and variations of the illustrated structures as may come fairly within the scope of the protection prayed.

What I claim is:

1. A register of the character described, including a series of registering wheels, and carrying means, certain of said registering wheels being of greater diameter than others and all of said registering wheels having their peripheries in substantially the same plane at the reading line.

2. In a register of the character described, a series of registering wheels, and carrying means, said registering wheels being disposed side by side in series and certain of said wheels being mounted eccentrically with respect to each other.

3. In a register of the character described, a series of registering wheels representing progressive denominations, carrying means, a plurality of supporting shafts for said wheels, said shafts being arranged out of alinement, the wheel or wheels mounted on one of said shafts being of greater diameter than the wheels mounted on the other of said shafts, and the peripheries of all of said wheels being in substantially the same plane at one point.

4. In a register of the character described, a series of registering wheels certain of which are of different diameters, carrying means and an alined series of operating members arranged to operate the registering wheels and to be successively engaged by a master actuator.

5. In a register of the character described, a series of registering wheels certain of which are of different diameters and are arranged eccentrically, carrying means, and an alined series of toothed operating wheels engaging the registering wheels to operate the same, the teeth of said operating wheels being alined when said wheels are at rest to permit the engagement of successive wheels by a toothed master means advanced in a rectilinear path to successive operating wheels.

6. In a register of the character described, a series of registering wheels, certain of which are of different diameters and eccentrically mounted with respect to each other, and carrying mechanism for the registering wheels, said carrying mechanism including means for carrying or transferring values from one wheel to another wheel mounted eccentrically with respect thereto.

7. In a register of the character described, the combination with a series of registering wheels, certain of which are of different diameters and are mounted eccentrically with respect to each other, of a series of spring-actuated carrying devices each mounted to advance one of the wheels a single increment, and a series of controlling members certain of which are operated by the registering wheels to release certain of the carrying devices.

8. In a register of the character described, the combination with a series of registering wheels, and a series of operating wheels therefor, of carrying mechanism, and controlling devices for the carrying mechanism, certain of said controlling devices being operative by certain of the idlers and one or more of said controlling devices being operative by registering wheels.

9. In a register of the character described, the combination with a series of registering wheels, of a series of operating idlers therefor, carrying members arranged to operate the idlers, and controlling devices for the carrying members, different controlling devices being arranged for operation by an idler and a registering wheel respectively.

10. In a register of the character described, the combination with two supporting shafts arranged out of alinement, of registering wheels mounted on the respective shafts, an alined series of idlers engaging the registering wheels, carrying members coöperating with the idlers, controlling devices for the carrying members, means for operating one or more of the controlling devices from one or more registering wheels mounted on one of the shafts, and means for operating the other controlling devices from the idlers engaging the registering wheels mounted on the other shaft.

11. In a register of the character described, the combination with a series of registering wheels, one of which is of greater diameter than others and mounted eccentrically with respect thereto, an alined series of idlers, an alined series of operating members for said registering wheels, carrying members arranged to operate the operating members, controlling devices for the carrying members, means for operating certain of the controlling devices from certain of the idlers, and means for operating one of said controlling devices from the enlarged registering wheel.

12. In a register of the character described, the combination with a series of registering wheels divided into two groups mounted eccentrically with respect to each other and the wheels of one group being larger than the wheels of the other group, of an alined series of members for the operating wheels of both groups, and carrying mechanism including controlling devices certain of which are operated by the operating members of one group of registering wheels and certain others of which are operated by the registering wheels of the other group.

13. In a register of the character described, the combination with a casing, of a partition subdividing the casing into compartments, separate groups of registering wheels mounted in the respective compartments, the wheels of one group being larger than the wheels of the other group, and the two groups of wheels being eccentrically mounted with respect to each other, an alined series of operating members for the several registering wheels, and carrying mechanism one or more elements of which are extended through the partition.

14. In a register of the character described, the combination with a series of registering wheels representing progressive denominations, of carrying mechanism, means arranged to cause each of said wheels to transfer the value accumulated thereon to the wheel of next higher order, said carrying means including means whereby certain of the wheels will carry oftener during each complete rotation than certain other wheels.

15. In a register of the character described, the combination with the necessary coöperating parts, of a series of registering wheels representing progressive denominations, certain of said wheels having a single series of numbers extending entirely around its periphery, and one or more of said wheels having a plurality of series of numbers displayed thereon.

16. In a register of the character described, the combination with registering wheels and carrying mechanism, certain of said registering wheels being of different diameters and eccentrically mounted with respect to each other, of resetting mechanism common to all the wheels.

17. In a register of the character described, the combination with a series of registering wheels, of a series of operating members therefor, resetting mechanism arranged to reset certain of the registering wheels through the medium of their operating members and to reset certain other registering wheels directly.

18. In a register of the character described, the combination with a series of registering wheels divided into two groups or sets, the wheels of one group or set being larger than the wheels of the other group or set and mounted eccentrically with respect thereto, of a series of operating members for the wheels, and resetting mechanism arranged to reset one group of wheels through the operating members thereof and to reset the other group of wheels by a connection independent of the other operating members.

19. In a register of the character described, the combination with two supporting shafts arranged out of alinement, of registering wheels mounted on the respective shafts, operating members for the several wheels, means for operating the wheels on one of the shafts through the medium of the operating members of said wheels, and means for causing the other shaft to reset the wheel or wheels mounted thereon.

20. In a register of the character described, the combination with a series of registering wheels certain of which are of different diameters and eccentrically mounted with respect to each other, of carrying members for the wheels, selectors controlling the carrying members, and resetting mechanism common to the wheels, carrying members and selectors.

21. In a register of the character described, the combination with a series of registering wheels, of carrying members and selectors, and resetting means including a rocker and means for operating the rocker to reset the carrying members and selectors, to subsequently permit movement of the selectors as the wheels reach their zero positions, to again set the selectors after the wheels have been reset, and to finally return the rocker to normal position.

22. In a register of the character described, the combination with a series of registering wheels, carrying members and selectors, of resetting means including a rocker, and means for causing the rocker to perform the following functions: to reset the carrying members and selectors, to then partially retract in order to permit movement of the selectors as the wheels reach their zero positions, to then move forward again to set the selectors after the wheels have been reset, and to finally retract to its normal position, and a stop mechanism controlling the partial retraction of the rocker.

23. In a register, the combination with a series of ten increment pounds wheels, a plurality of ten increment shillings wheels and a plurality of twelve increment wheels appropriated to farthings and pence, carrying means for transferring values from each denomination to the denomination of next higher order, and a second series of wheels coacting with the pounds, shillings and pence wheels, the wheels of said second series having their peripheries alined at one point to facilitate the successive engagement thereof by a master means.

In testimony that I claim the foregoing as my own, I have hereto affixed my signature in the presence of two witnesses.

JOHN ASBURY SMITH.

Witnesses:
PATRICK H. TURLEY,
A. W. SWENGEL.

Copies of this patent may be obtained for five cents each, by addressing the "Commissioner of Patents, Washington, D. C."